United States Patent
Follert et al.

[11] 3,861,765
[45] Jan. 21, 1975

[54] RACK DRILL CUTTING WHEEL BEARING

[75] Inventors: Hans Gunter Follert, Dortmund; Albert Beyer, Werne an der Lippe, both of Germany

[73] Assignee: Gewerkschaft Eisenhutte Westfalia, Westfalia, Germany

[22] Filed: June 11, 1973

[21] Appl. No.: 368,917

[30] Foreign Application Priority Data
June 13, 1972 Germany............................ 2228727

[52] U.S. Cl.............. 308/8.2, 277/92, 308/36.2, 308/187.1, 308/236
[51] Int. Cl..... F16c 19/38, F16c 29/12, F16c 33/78
[58] Field of Search............. 277/92; 308/8.2, 36.1, 308/36.2, 187.1, 214, 236; 29/103 R; 175/227, 371, 372

[56] References Cited
UNITED STATES PATENTS

| | | | |
|---|---|---|---|
| 1,803,625 | 5/1931 | Larson............................ | 308/187.1 |
| 1,813,315 | 7/1931 | Peterman..................... | 308/187.1 X |
| 3,216,513 | 11/1965 | Ribbins et al................... | 308/8.2 X |
| 3,752,243 | 8/1973 | Hummer et al................. | 308/8.2 X |

*Primary Examiner*—M. Henson Wood, Jr.
*Assistant Examiner*—Howard Beltran
*Attorney, Agent, or Firm*—Markva & Smith

[57] ABSTRACT

A rock-drill bit assembly composed of a cutting wheel affixed to a body which is rotatably mounted on a stationary shaft. A bearing cavity disposed between the shaft and the body accommodates roller bearings located in inner and outer races. The inner races engage a central projection on the body. The shaft is provided with threaded end portions and a collar; one of the inner races abuts this collar. A nut is screwed into the threaded end portions remote from the collar to bear on the other of the inner races through a spacing ring. The nut serves to adjust the position of the roller bearings and can be clamped to the shaft. Metallic sealing rings in slidable contact are provided at each end of the bearing cavity. Each of the innermost sealing rings has a shaped portion locating an elastic ring which bears on a wall of a recess in the body and each of the outermost sealing rings has a similar shaped portion locating a further elastic ring which bears on a bearing cover screwed onto the threaded end portion of the shaft. The covers can be screwed along the shaft to compress the elastic rings which provide axial thrust to urge the sealing rings together.

20 Claims, 1 Drawing Figure

PATENTED JAN 21 1975　　3,861,765
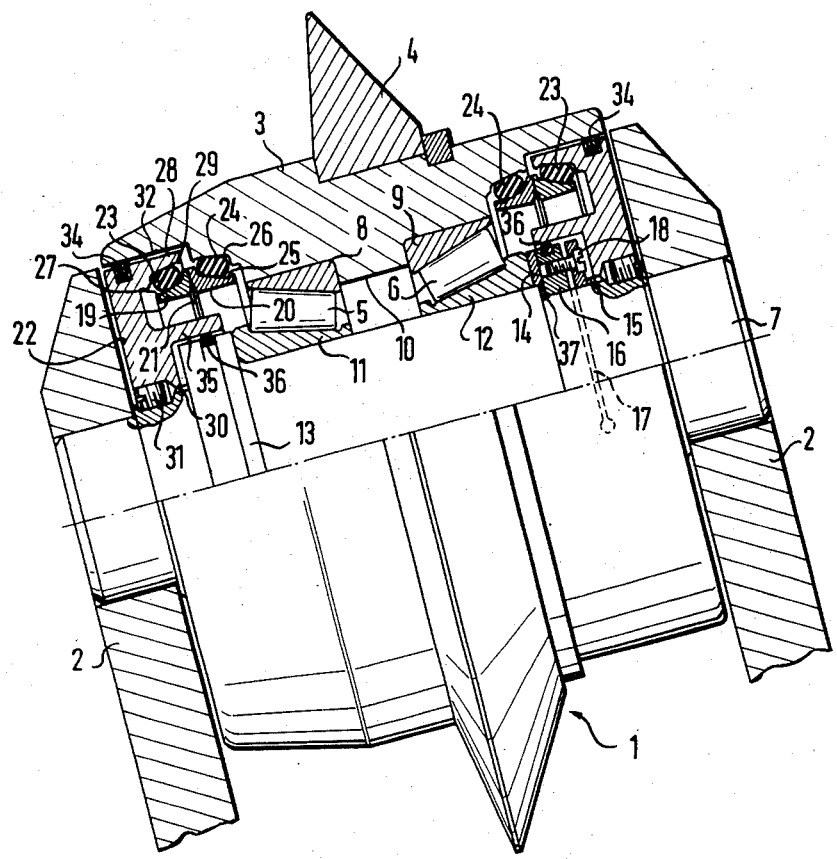

RACK DRILL CUTTING WHEEL BEARING

BACKGROUND TO THE INVENTION

The present invention relates to a roller bit assembly for a rock drill usuable in mining and tunnelling.

The roller bits of a rock drill are usually subject to great stress during use and this is particularly the case with the bearings for the bits which have to cope with considerable forces in alternate directions. It is hence necessary to adjust the bearings accurately and ensure that the bearings are adequately lubricated and protected from the ingress of dust or the like. Hitherto, the known roller bit assemblies have not been wholly satisfactory in that the bearings are apt to suffer from premature wear necessitating frequent replacement.

A general object of this invention is to provide an improved form of roller bit assembly.

SUMMARY OF THE INVENTION

According to the present invention there is provided a roller bit assembly for a rock drill; said assembly comprising a shaft for mounting between supports on a cutter head of the drill, a body having a cutting wheel affixed to its exterior, the body being rotatably supported on the shaft by means of roller bearings mounted in a bearing cavity defined between the shaft and the body and adapted to contain lubricant, sealing means at the ends of the bearing cavity, each sealing means at least including two metallic rings with plane radial surfaces in sliding contact, means for adjusting the position of the roller bearings and means for adjusting the contact pressure between the metallic rings independently of the adjustment of the roller bearings.

Preferably the roller bearings are located in inner and outer races, the inner races being adjustable by said adjusting means.

The shaft may have threaded portions and a collar and the body may have a central projection facing the shaft. The inner races may then be located between the projection and the collar and between the projection and a nut engaged on one of the threaded portions. A spacing ring or washer is preferably interposed between the nut and the adjacent inner race. The nut is then used to adjust the roller bearings and preferably the nut can be selectively clamped or locked to secure the bearings in the desired position. To this end the nut can have a radial slit and a screw or bolt extending across the slit.

Further according to the invention the metallic rings are urged together by elastic rings and the compression of the elastic rings is adjusted by the adjusting means. Bearing covers can be screwed onto the threaded portions of the shaft to adjust the compression of the elastic rings and hence the contact pressure between the metallic rings. The contact pressure between the metallic rings can be accurately adjusted to an optimum value with the bearing covers regardless of manufacturing tolerances and wear. The bearing covers are preferably selectively securable to the shaft by means of grub screws or the like. Each metallic sealing ring preferably has a shaped portion which seats and contacts one of the elastic rings which also seats on a confronting surface on the associated cover or the body. Preferably each elastic ring rests between non-parallel confronting inclined surfaces. These surfaces may be formed on the metallic rings on annular axial flanges of the covers and on stepped recesses of the body.

According to a further feature of the invention the bearing covers are of identically similar design and have an outer and an inner axial flange. The outer flange engages in an axial recess of the body while the inner ring flange extends over the shaft collar, or over the nut serving to adjust the roller bearings. Sealing devices are preferably provided between the outer flanges of the covers and the body, between the inner flanges and the shaft collar or nut and also between the nut and the shaft. These additional sealing devices supplement the metallic sealing rings and serve to prevent the ingress of dust or the like into the bearing cavity and prevent the escape of lubricant.

The invention may be understood more readily and various other features of the invention may become more apparent from consideration of the following description.

BRIEF DESCRIPTION OF DRAWINGS

A preferred embodiment of the invention will now be described, by way of example only, with reference to the accompanying drawing which is a part-sectional side view of a roller bit assembly made in accordance with the invention.

DESCRIPTION OF PREFERRED EMBODIMENT

As shown in the drawing an assembly, generally denoted 1, is mounted by means of supports or holders 2 on the cutter head (not shown) of a rock drill. Normally several roller bits 1 would be provided on the head in known manner. The roller bit of the assembly 1 is essentially composed of a main body 3 and a cutting wheel 4 affixed to the body 3 at the central exterior region thereof. The body 3 is rotatably supported by roller bearings 5, 6 on a shaft 7 fixed in position between the supports 2. The roller bearings 5, 6 are in the form of tapered roller bearings disposed between outer races 8, 9 and inner races 11, 12. The races 8 – 11 and the bearings 5, 6 are disposed in a bearing cavity defined between the shaft 7 and the body 3. The outer races 8, 9 abut against end surfaces of a projection 10 of the body 3 which extends radially inwards. The bearings 5, 6 can be adjusted and secured in position by the location of their inner races 11 and 12. More particularly, the race 11 for the bearing 5 abuts against a collar 13 formed on the shaft 7 and the race 12 is engaged by a spacing ring 14 which is subjected to the action of a nut 16 screwed onto a threaded portion 15 of the shaft 7. The roller bearings 5, 6 can be adjusted and secured together by adjustment of the nut 16. The nut 16 has a radial slit so that when the nut 16 is in its operative position it can be clamped in relation to the screw-threaded portion 15 of the shaft 7 by the aid of a screw-threaded member, i.e., a screw or bolt 18, passing across the slit 17 and engaging in a small threaded bore in the nut 16.

The bearing cavity accommodating the roller bearings 5, 6 contains lubricant and is sealed at both ends by metal-to-metal sealing means consisting of two metallic sealing rings 19 and 20 which are in sliding contact with one another via plane radial sealing surfaces 21. The rings 20 are arranged to move with the body 3 whereas the rings 19 are arranged to remain stationary with the shaft 7. Each sealing ring 19 is coupled to a fixed bearing cover 22 via an elastic ring 23 while each sealing ring 20 is coupled to the body 3 via an elastic ring 24. Each ring 24 seats firmly against an inclined surface 25 formed on the outer periphery of the associated sealing ring 20 and also against an inclined surface 26 formed by a corresponding recess in the body 3. The two surfaces 25, 26 in engagement with each ring 24 are not parallel to one another and hence the elastic ring 24 exerts on the associated sealing ring 20 an axially directed force by means of which the sealing surfaces 21 of the rings 19 and 20 are held against each other with sliding contact. Each elastic ring 23 likewise rests against an inclined surface 27 formed on the outer periphery of the associated sealing ring 19 and also against an inclined surface 29 provided on the inside of an axially directed annular flange 28 formed on the associated cover 22. The surfaces 27 and 29 are likewise non-parallel and the ring 24 also exerts an axially directed force on the ring 19. The over-all contact pressure between the sealing surfaces 21 of the rings 19, 20 in sliding contact with each other is thus provided by the sum of the axially directed force components of the elastic rings 23 and 24. The bearing covers 22 can be screwed onto the threaded portion 15 and a similar threaded portion 30 of the shaft 7 to compress the rings 23, 24. These covers 22 can be secured by grub screws 31 in the position to which they have been adjusted. The contact pressure between the sealing rings 19, 20 can in each case be adjusted to the optimum value, ensuring that the rings 19, 20 will rest sufficiently firmly against each other to ensure the maximum life for the metal-to-metal seals.

The overall arrangement enables the rings 19, 20 to be adjusted by means of the covers 22 independently of the adjustment of the roller bearings 5, 6, by means of the nut 16.

The axially directed annular flanges 28 of the bearing covers 22 each engage in an axial recess 32 in the body 3 with a certain amount of play and seals 34 of lamellar type are carried by the covers 22 to engage on the axial faces of the recess 32. The seals 34 serve primarily to prevent the ingress of dust or dirt into the bearing cavity.

In addition to the outer annular flanges 28 the bearing covers 22 are provided with inner annular flanges 35 which project in an axial direction and extend across the shaft collar 13 and the nut 16. Appropriate grooves in the shaft collar 13 and the nut 16 contain gaskets 36 which interact with the inner annular flanges 35 of the bearing covers 22 to prevent lubricating oil from escaping from the bearing cavity. A further sealing device 37, used also to prevent lubricating oil from escaping from the bearing cavity, is provided between the ring 14 on the one hand and the nut 16 and the shaft 7 on the other.

The construction is assembled by first of all mounting the roller bearing 5 on the shaft 7, so that the race 11 rests against the collar 13 of the shaft 7. The shaft 7 is then inserted into the body 3 and the roller bearings 6 and the ring 14 are now mounted on the shaft 7. The nut 16 is next screwed onto the shaft 7 until the self-aligning roller bearings 5, 6, is properly adjusted without play. When the nut 16 has been tightened up sufficiently it is clamped in respect of the shaft 7 by tightening up the screw or bolt 18, so that the self-aligning roller bearings 5, 6 are fixed in the desired position. After the installation and adjustment of the bearings 5, 6 the sealing rings 19 and 20 and also the elastic rings 23 and 24 are inserted and positioned. The bearing covers 22 are now screwed onto the shaft 7 to produce the required pre-stressing for the elastic rings 23 and 24. When the pre-stressing of the elastic rings 23 and 24 have been adjusted to urge the rings 19, 20 together, the bearing covers 22 are secured in position on the shaft 7 by means of the grub screws 31.

We claim:

1. In a roller bit assembly for a rock drill which assembly comprises a shaft for mounting between supports on a cutter head of the drill, a body carrying a cutting wheel, roller bearings rotatably mounting said body on said shaft, the roller bearings being disposed in a bearing cavity containing lubricant defined between the body and the shaft and sealing means in the form of metallic rings in sliding contact at the ends of the bearing cavity; the improvement comprising means for adjusting the position of the roller bearings and means for adjusting the contact pressure between the metallic rings independently of the adjustment of the roller bearings, said means for adjusting the position of the roller bearings comprising a collar and a screw-threaded portion on said shaft, a nut having a radial slit and being engaged on the screw-threaded portion of the shaft, a projection extending from said body towards the shaft, inner and outer races for said roller bearings, the inner races being located, respectively, between the collar and the projection and between the projection and the nut with the nut being adapted to adjust the position of the roller bearings, and a screw-threaded member extending across the radial slit of the nut and adapted to selectively clamp the nut with respect to the shaft to thereby secure the roller bearings in a desired position.

2. An assembly according to claim 1, wherein a spacing ring is disposed between the nut and the adjacent inner race.

3. An assembly according to claim 1, wherein the metallic rings are urged together by elastic rings the compression of which is adjusted by said adjusting means.

4. An assembly according to claim 3, wherein the means for adjusting the contact pressure between the metallic rings is in the form of bearing covers engaged with screw-threaded portions at the ends of the shaft.

5. In a roller bit assembly for a rock drill which assembly comprises a shaft for mounting between supports on a cutter head of the drill, a body carrying a cutting wheel, roller bearings rotatably mounting said body on said shaft, the roller bearings being disposed in a bearing cavity containing lubricant defined between the body and the shaft and sealing means in the form of metallic rings in sliding contact at the ends of the bearing cavity; the improvement comprising means for adjusting the position of the roller bearings and means for adjusting the contact pressure between the metallic rings independently of the adjustment of the roller bearings, said means for adjusting the contact pressure between the metallic rings comprising screw-threaded portions at opposite ends of the shaft, elastic rings for urging the metallic rings together, and bearing covers engaged with said screw-threaded portions and adapted for adjusting the compression of the elastic rings to thereby adjust said contact pressure between the metallic rings.

6. An assembly according to claim 5, wherein the covers can be selectively secured to the shaft by means of grub screws.

7. An assembly according to claim 5, wherein the metallic rings at each end of the bearing cavity are each provided with one of said elastic rings.

8. An assembly according to claim 7, wherein each of the elastic rings seats on non-parallel surfaces one of which is provided on the associated metallic ring and the other of which is provided on an annular flange of the associated bearing cover or in a recess of the body.

9. An assembly according to claim 8, wherein the annular flanges of the bearing covers carry further seals engaging on a further recess in the body and serving to prevent dust or the like from entering the bearing cavity.

10. An assembly according to claim 5, wherein the roller bearings are located in inner and outer races, the inner races being adjustable by said adjusting means.

11. An assembly according to claim 10, wherein the shaft has a collar and a screw-threaded portion and the body has a projection extending towards the shaft, the inner races being located, respectively, between the collar and the projection and between the projection and a nut engaged on the screw-threaded portion, the nut serving as the means for adjusting the position of the roller bearings.

12. An assembly according to claim 11, wherein the nut is provided with a radial slit and accommodates a screw-threaded member extending across the slit and adapted to selectively clamp the nut with respect to the shaft to thereby secure the roller bearings in a desired position.

13. A roller bit assembly for a rock drill, said assembly comprising:
   a. a shaft for mounting between supports on a cutter head of the drill, the shaft having threaded end portions and a collar;
   b. a nut engaged in one of the threaded portions of the shaft and bearing covers engaged on each of the threaded portions, each bearing cover having an inwardly directed axial flange;
   c. a body carrying a cutting wheel and having a projection extending towards the shaft and stepped recesses at its ends;
   d. roller bearings located in inner and outer races between the shaft and the body with the inner races being located respectively, between the collar and the projection and the projection and the nut, the nut being operable to adjust the position of the bearings;
   e. a pair of metallic sealing rings with their radial faces in sliding contact provided axially outwards of the bearings relative to the projection, the metallic rings have shaped portions with surfaces extending in non-parallel confronting relationship to surfaces of one of the recesses of the body and of the flanges of the bearing covers; and
   f. elastic rings mounted between the confronting surfaces of the metallic rings and the recesses and the flanges so as to urge the metallic rings together whereby the bearing covers can adjust the contact pressure between the metallic rings.

14. An assembly according to claim 13, wherein the nut and the bearing covers are provided with means for selectively clamping the nut and the covers to the shaft.

15. An assembly according to claim 13, wherein the bearing covers have further axial flanges disposed radially inwards of the first-mentioned flanges and further seals are provided between the outer flanges of the covers and the recesses of the body, between the inner flanges of the covers and the collar and the nut and between the nut and the shaft.

16. In a roller bit assembly for a rock drill which assembly comprises a shaft for mounting between supports on a cutter head of the drill, a body carrying a cutting wheel, roller bearings rotatably mounting said body on said shaft, the roller bearings being disposed in a bearing cavity containing lubricant defined between the body and the shaft and sealing means in the form of metallic rings in sliding contact at the ends of the bearing cavity; the improvement comprising means for adjusting the position of the roller bearings and means for adjusting the contact pressure between the metallic rings independently of the adjustment of the roller bearings, said means for adjusting the position of the roller bearings comprising a collar and screw-threaded portions at opposite ends of the shaft, a nut having a radial slit and being engaged on the screw-threaded portion at one end of the shaft, a projection extending from said body towards the shaft, and inner and outer races for said roller bearings, the inner races being located, respectively, between the collar and the projection and between the projection and the nut with the nut being adapted to adjust the position of the roller bearing; and said means for adjusting the contact pressure between the metallic rings comprising elastic rings for urging the metallic rings together and bearing covers engaged with said screw-threaded portions and adapted for adjusting the compression of the elastic rings to thereby adjust said contact pressure between the metallic rings.

17. An assembly according to claim 16, wherein each of the elastic rings seats on non-parallel surfaces one of which is provided on the associated metallic ring and the other of which is provided on an annular flange of the associated bearing cover or in a recess of the body.

18. An assembly according to claim 17, wherein the covers have further annular flanges disposed inwardly towards the shaft from the first mentioned flanges, the further flanges projecting over the collar and the nut, there being provided gaskets disposed between the further flanges and the nut and collar to prevent lubricant from escaping from the bearing cavity.

19. In a roller bit assembly for a rock drill which assembly comprises a shaft for mounting between supports on a cutter head of the drill, a body carrying a cutting wheel, roller bearings rotatably mounting said body on said shaft, the roller bearings being disposed in a bearing cavity containing lubricant defined between the body and the shaft and sealing means in the form of metallic rings in sliding contact at the ends of the bearing cavity; the improvement comprising means for adjusting the position of the roller bearings and means for adjusting the contact pressure between the metallic rings independently of the adjustment of the roller bearings, said means for adjusting the position of the roller bearings comprising a collar and a screw-threaded portion on said shaft, a nut having a radial slit and being engaged on the screw-threaded portion of the shaft, a projection extending from said body towards the shaft, inner and outer races for said roller bearings, the inner races being located, respectively, between the collar and the projection and between the projection and the nut with the nut being adapted to adjust the position of the roller bearings, and a further sealing device between the nut and the shaft to prevent the escape of lubricant from the bearing cavity.

20. In a roller bit assembly for a rock drill which assembly comprises a shaft for mounting between supports on a cutter head of the drill, a body carrying a cutting wheel, roller bearings rotatably mounting said body on said shaft, the roller bearings being disposed in a bearing cavity containing lubricant defined between the body and the shaft and sealing means in the form of metallic rings in sliding contact at the ends of the bearing cavity; the improvement comprising means for adjusting the position of the roller bearings and means for adjusting the contact pressure between the metallic rings independently of the adjustment of the roller bearings, said means for adjusting the position of the roller bearings comprising bearing covers, an elastic ring associated with each metallic ring for urging the metallic rings together, each of the elastic rings being seated on non-parallel surfaces, one of which is provided on the associated metallic ring and the other of which is provided on an annular flange of the associated bearing cover, the annular flanges of the bearing covers carrying further seals engaging on a recess in the body and serving to prevent dust or the like from entering the bearing cavity.

* * * * *